(12) United States Patent  
Kimura

(10) Patent No.: US 11,991,320 B2  
(45) Date of Patent: May 21, 2024

(54) IMAGE FORMING DEVICE, INFORMATION PROCESSING DEVICE, DISPLAY SYSTEM, AND DISPLAY METHOD

(71) Applicant: SEIKO EPSON CORPORATION, Tokyo (JP)

(72) Inventor: Shohei Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/165,364

(22) Filed: Feb. 7, 2023

(65) Prior Publication Data

US 2023/0254416 A1 Aug. 10, 2023

(30) Foreign Application Priority Data

Feb. 9, 2022 (JP) .................................. 2022-018522

(51) Int. Cl.
*G06F 15/00* (2006.01)
*H04N 1/00* (2006.01)

(52) U.S. Cl.
CPC ..... *H04N 1/00068* (2013.01); *H04N 1/00074* (2013.01); *H04N 2201/0094* (2013.01)

(58) Field of Classification Search
None
See application file for complete search history.

(56) References Cited

U.S. PATENT DOCUMENTS

| 2009/0190162 | A1* | 7/2009 | Kohama | G06F 3/1259 |
| | | | | 358/1.15 |
| 2011/0188061 | A1* | 8/2011 | Miyamoto | G06K 15/16 |
| | | | | 358/1.12 |
| 2018/0278793 | A1* | 9/2018 | Ito | H04N 1/32106 |
| 2019/0042170 | A1* | 2/2019 | Yamada | G06F 3/1259 |

FOREIGN PATENT DOCUMENTS

| JP | 2004-054086 A | 2/2004 |
| JP | 2004-236149 A | 8/2004 |
| JP | 2005-035024 A | 2/2005 |
| JP | 2015-035726 A | 2/2015 |

* cited by examiner

*Primary Examiner* — Mark R Milia
(74) *Attorney, Agent, or Firm* — Global IP Counselors, LLP

(57) ABSTRACT

An image forming device includes an image reader that reads an image of a first original; a printing unit that prints an image read by the image reader on a recording medium; a touch panel; and a first controller that calculates, based on the image read by the image reader and a set print setting, a first required time period required to form the image of the first original, calculates, based on the first required time period, a second required time period required to form an image of a second original read by the image reader and added to the first original, calculates, based on the first required time period and the second required time period, a completion period for completing the printing by the printing unit, and displays on the touch panel the calculated completion period.

9 Claims, 6 Drawing Sheets

IMAGE FORMING DEVICE, INFORMATION PROCESSING DEVICE, DISPLAY SYSTEM, AND DISPLAY METHOD

The present application is based on, and claims priority from JP Application Serial Number 2022-018522, filed Feb. 9, 2022, the disclosure of which is hereby incorporated by reference herein in its entirety.

BACKGROUND

1. Technical Field

The present disclosure relates to an image forming device, an information processing device, a display system, and a display method.

2. Related Art

An image forming device is known, which displays a time period from the start of the formation of an image on a medium to the completion of the formation of the image.

For example, JP-A-2005-35024 discloses an ink jet recording device that calculates, before printing, a time period required for recording in accordance with a total scanning period and a time period for transporting recording paper in units of recording.

However, when printing is performed on long roll paper or the like, it may be difficult to estimate a time period for completing the printing. In such a case, a user cannot check a time period for completing printing.

SUMMARY

According to an aspect of the present disclosure, an image forming device includes a reader that reads an image of a first original; an image forming unit that forms an image read by the reader on a recording medium; a display unit; and a controller that calculates, based on the image read by the reader and a set image formation condition, a first required time period required to form the image of the first original, calculates, based on the first required time period, a second required time period required to form an image of a second original read by the reader and added to the first original, calculates, based on the first required time period and the second required time period, a completion period for completing an image formation by the image forming unit, and displays on the display unit the calculated completion period.

According to another aspect of the present disclosure, an information processing device includes a display unit; a communication unit that communicates with an image forming device; and a second controller that calculates, based on information of an image of a first original read by the image forming device and an image formation condition set in the image forming device, a first required time period required to form the image of the first original upon receiving, from the image forming device, the information of the image of the first original and the image formation condition, calculates, based on the first required time period, a second required time period required to form an image of a second original upon receiving information of the image of the second original read by the image forming device, calculates, based on the first required time period and the second required time period, a completion period for completing the image formation by the image forming device, and displays on the display unit the calculated completion period.

According to still another aspect of the present disclosure, a display system includes an image forming device and an information processing device, and the information processing device includes a display unit and a controller that calculates, based on information of an image of a first original read by the image forming device and an image formation condition set in the image forming device, a first required time period required to form the image of the first original, calculates, based on the first required time period, a second required time period required to form an image of a second original read by the image forming device and added to the first original, calculates, based on the first required time period and the second required time period, a completion period for completing the image formation by the image forming device, and displays on the display unit the calculated completion period.

According to still another aspect of the present disclosure, a display method includes calculating, based on information of an image of a first original read by an image forming device and an image formation condition set in the image forming device, a first required time period required to form the image of the first original; calculating, based on the first required time period, a second required time period required to form an image of a second original read by the image forming device and added to the first original; calculating, based on the first required time period and the second required time period, a completion period for completing an image formation by the image forming device; and displaying the calculated completion period on either a display unit included in the image forming device or a display unit included in an information processing device that can communicate with the image forming device.

DESCRIPTION OF EXEMPLARY EMBODIMENTS

Hereinafter, embodiments of the present disclosure are described.

Figure 1:
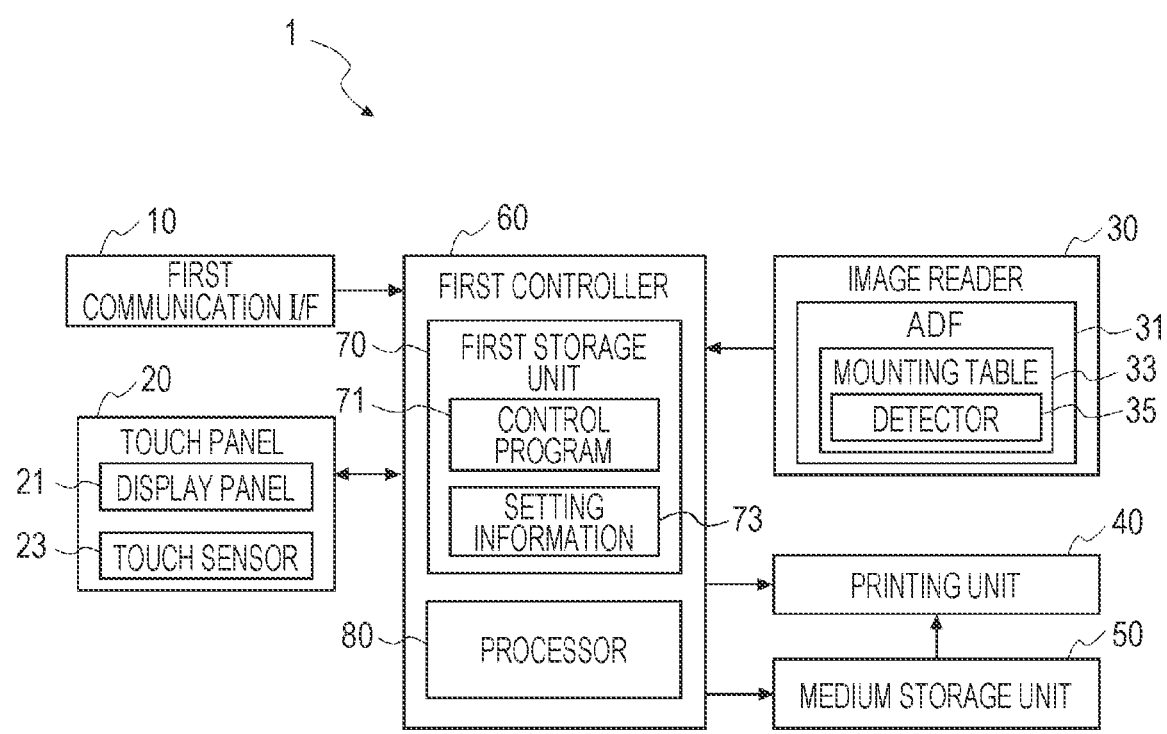
FIG. 1 is a block diagram illustrating a configuration of a multifunction peripheral device.

FIG. 1 is a block diagram illustrating a configuration of a multifunction peripheral device 1. The multifunction peripheral device 1 corresponds to an image forming device. The multifunction peripheral device 1 includes a first communication interface 10, a touch panel 20, an image reader 30, a printing unit 40, a medium storage unit 50, and a first controller 60. The term "interface" is hereinafter abbreviated as I/F. Although the present embodiment exemplifies the multifunction peripheral device 1 as the image forming device, the image forming device may not include the image reader 30 and may be a printer externally connectable to a scanner separate from the printer.

The first communication I/F 10 is an interface for wireless communication such as Bluetooth or Wi-Fi. Bluetooth and Wi-Fi are registered trademarks. The first communication I/F 10 may be a wired interface including an interface circuit and a terminal such as a universe serial bus (USB) connector or an Ethernet connector.

The touch panel 20 corresponds to a display unit and an operation unit. The touch panel 20 includes a display panel 21 and a touch sensor 23 and receives a touch operation performed by a user. As the display panel 21, for example, a liquid crystal panel or an organic electroluminescence (EL) panel is used. The touch sensor 23 detects a touch operation performed by the user on the display panel 21. A coordinate system is set in the display panel 21 in advance. The touch sensor 23 outputs, to the first controller 60, an operation signal including coordinate information indicating a position on the display panel 21 touched by the user.

The image reader 30 corresponds to a reader. The image reader 30 includes an auto document feeder (ADF) 31. The ADF 31 includes an original feeder that feeds an original mounted on a mounting table 33 onto platen glass, and a scanner that optically reads the original fed by the original feeder or the original mounted on the platen glass. The original feeder and the scanner are not illustrated.

The image reader 30 performs a reading operation of irradiating the original fed to the platen glass with light emitted from a light source, and receiving the light reflected from the original by a charge-coupled device (CCD) sensor to read an image of the original so as to generate image data. The image reader 30 outputs the generated image data to the first controller 60.

The image reader 30 includes a detector 35. The detector 35 includes a sensor that detects the weight of the original mounted on the mounting table 33. The detector 35 outputs, to the first controller 60, sensor data indicating the detected weight of the original. The detector 35 may include a sensor that detects the number of originals mounted on the mounting table 33. The detector 35 may include a sensor that detects the thickness of the original mounted on the mounting table 33.

The printing unit 40 corresponds to an image forming unit. The printing unit 40 includes an ink jet head that ejects ink onto a print medium to form a dot on the print medium, a carriage that moves the ink jet head in a scan direction, and a carriage drive motor that drives the carriage. The printing unit 40 further includes a transport unit that transports the print medium, and an ink supply unit that supplies the ink to the ink jet head. The printing unit 40 performs a printing operation of ejecting the ink from a nozzle of the ink jet head in accordance with control by the first controller 60 to print an image on the transported print medium.

The medium storage unit 50 stores the print medium. The print medium corresponds to a recording medium. The print medium stored in the medium storage unit 50 may be a continuous sheet such as roll paper or may be paper cut to a standard size. The roll paper may be roll paper of a large size such as A1 size or A2 size, for example. The print medium stored in the medium storage unit 50 is transported by a transport mechanism not illustrated to a position where the ink ejected from the ink jet head of the printing unit 40 adheres to the transported print medium.

The first controller 60 includes a first storage unit 70 and a processor 80. The first controller 60 corresponds to a controller included in the image forming device.

The first storage unit 70 includes a volatile memory such as a random-access memory (RAM) and a nonvolatile memory such as a read-only memory (ROM). The ROM stores a control program 71 and setting information 73. The RAM is used as an arithmetic region for the processor 80.

The setting information 73 is information regarding an operational setting of the multifunction peripheral device 1. The setting information 73 includes information in which weights of originals detected by the detector 35 of the multifunction peripheral device 1 are associated with the numbers of originals corresponding to the weights.

The processor 80 is constituted by a central processing unit (CPU) or a micro-processing unit (MPU). The processor 80 executes the control program 71 to control the units of the multifunction peripheral device 1.

First Operation

The first controller 60 causes the image reader 30 to perform the reading operation and the printing unit 40 to perform the printing operation in parallel. When the image data is input to the first controller 60 from the image reader 30, the first controller 60 converts the input image data into print data and outputs the converted print data to the printing unit 40. When the original to be read by the image reader 30 includes a plurality of pages, the reading operation of the image reader 30 and the printing operation of the printing unit 40 are performed in parallel. The print data is data for image formation and is obtained by converting the image data such that the printing unit 40 can print the image data. The print data includes a command to control the printing unit 40.

In addition, the first controller 60 calculates a time period required for the printing unit 40 to print the print data and a printing completion period, which is a time period for completing the printing. The printing completion period corresponds to a completion period. The time period required to print the print data is a time period required for the printing unit 40 to print the print data. This print data is obtained by converting the image data obtained by reading the image of the single original.

The printing completion period is a time period from the start of the printing by the printing unit 40 to the completion of the printing of all the image data read by the image reader 30.

For example, when a print setting is received by the first controller 60 via a touch operation performed on the touch panel 20 and a start key that is a key for starting copying and is displayed on the touch panel 20 is pressed, the first controller 60 transmits an instruction to read an original to the image reader 30. When the read instruction is input to the image reader 30 from the first controller 60, the image reader 30 starts reading the original mounted on the mounting table 33. The print setting includes the size of the print medium on which an image is to be printed, a setting for single-sided or double-sided printing, and a setting for a print density, for example. The print setting corresponds to an image formation condition.

The image reader 30 reads an image of the original to generate image data and outputs the generated image data to the first controller 60. The image data generated first by the image reader 30 after the start key is pressed is referred to as first image data. The original read first by the image reader 30 after the start key is pressed corresponds to a first original. When the first image data is input to the first controller 60, the first controller 60 calculates a basic required time period in accordance with information of the input first image data and the print setting. The information of the first image data includes, for example, a size of the first image data in a vertical direction and a size of the first image data in a horizontal direction. The first controller 60 causes the calculated basic required time period to be stored in the first storage unit 70. The basic required time period corresponds to a first required time period.

Next, the first controller 60 converts the first image data into print data and outputs the converted print data to the printing unit 40.

When a plurality of originals are mounted on the mounting table 33, or when an original to be newly read is mounted on the mounting table 33 by the user, the image reader 30 reads an image of the originals mounted on the mounting table 33 or newly reads an image of the original mounted on the mounting table 33 to generate image data. The image reader 30 outputs the generated image data to the first controller 60. The image data of the second and subsequent originals read by the image reader 30 after the start key is pressed is referred to as second image data. Each of the second and subsequent originals corresponds to a second original. That is, each of the second and subsequent originals corresponds to a second original added to the first original.

When the second image data is input to the first controller 60, the first controller 60 calculates a time period required to print the first image data and the second image data. The first controller 60 assumes that a time period required to print the second image data is equal to the basic required time period required to print the first image data.

The first controller 60 sums the basic required time period and the basic required time period and causes the sum of the basic required time periods to be stored as a cumulative required time period in the first storage unit 70. Thereafter, the first controller 60 converts the second image data into print data and outputs the converted print data to the printing unit 40.

A time period obtained by subtracting the basic required time period required to print the first image data from the cumulative required time period corresponds to a second required time period. For example, when the image reader 30 reads three originals, the image reader 30 generates first image data that is image data of the first original, and second image data that is image data of the second and third originals. A time period required to print the first image data corresponds to the first required time period. A time period required to print the second image data that is the image data of the second and third originals corresponds to the second required time period.

The first controller 60 repeatedly performs the above-described process while the input of the second image data to the first controller 60 from the image reader 30 continues.

For example, when the second image data obtained by reading the third original is input to the first controller from the image reader 30, the first controller 60 updates the cumulative required time period. The first controller 60 reads the cumulative required time period and the basic required time period from the first storage unit 70, adds the basic required time period to the cumulative required time period, and causes the required time period obtained by adding the basic required time period to the cumulative required time period to be stored as the cumulative required time period in the first storage unit 70. That is, the first controller 60 updates the cumulative required time period stored in the first storage unit 70. Thereafter, the first controller 60 converts the second image data into print data and outputs the converted print data to the printing unit 40.

When the second image data is not continuously input to the first controller 60 from the image reader 30 for a preset time period or longer, the first controller 60 determines that the reading of images of the originals ended, and calculates a printing completion period. The first controller 60 calculates a required time period by subtracting, from the cumulative required time period, a time period elapsed since the transmission of the print data to the printing unit 40. In this case, the first controller 60 calculates the required time period as the printing completion period. The first controller 60 displays the calculated printing completion period on the touch panel 20.

First Operation

Figure 2:
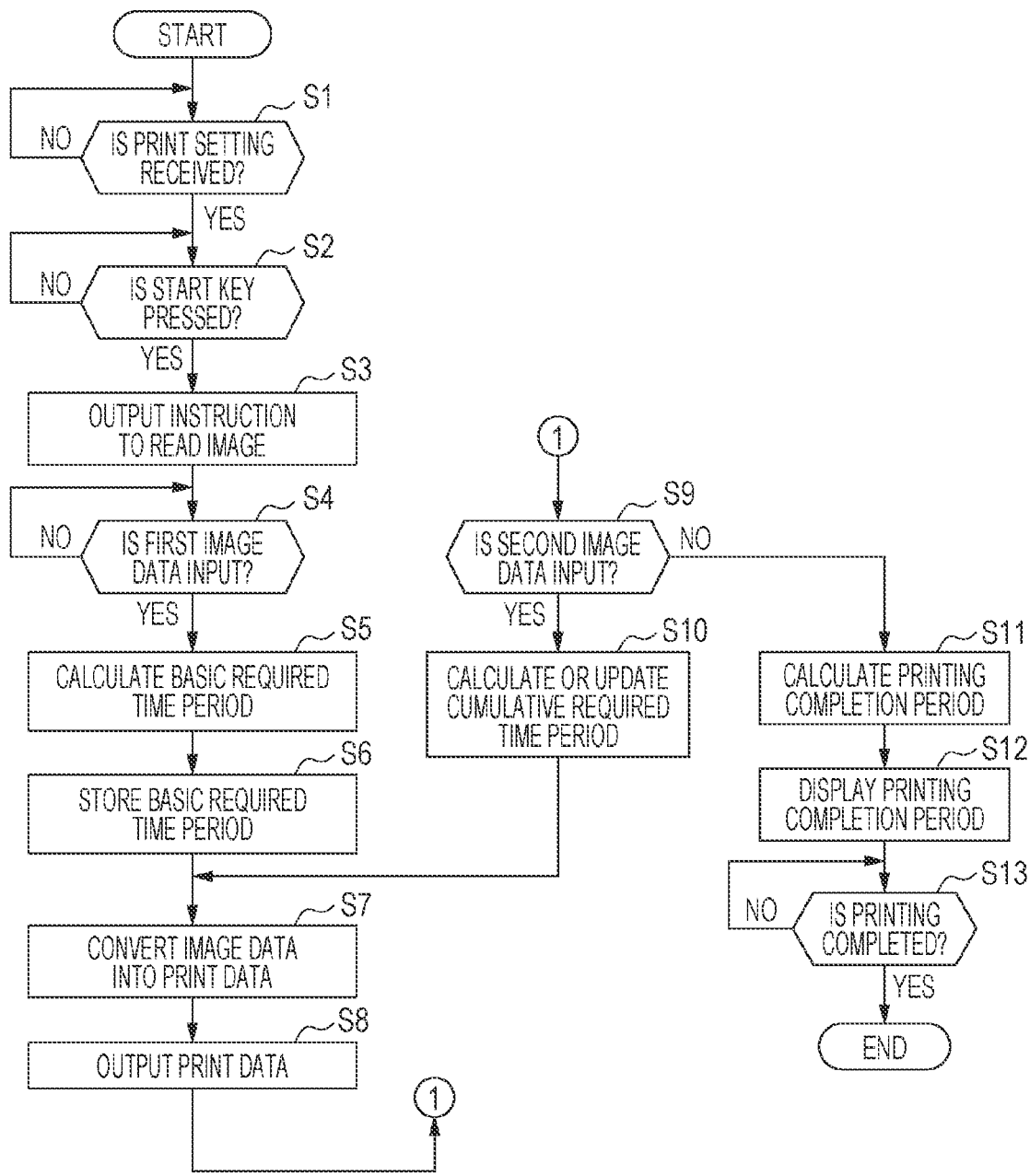
FIG. 2 is a flowchart illustrating a first operation of the multifunction peripheral device.

FIG. 2 is a flowchart illustrating a first operation of the multifunction peripheral device 1.

The first operation of the multifunction peripheral device 1 is described with reference to the flowchart illustrated in FIG. 2.

First, the first controller 60 determines whether the first controller 60 already receives the print setting (step S1). The user operates the touch panel 20 to enter the print setting including the print density and the setting for single-sided or double-sided printing. When the first controller 60 does not receive the print setting (NO in step S1), the first controller 60 waits until the first controller 60 receives the print setting.

When the first controller 60 receives the print setting (YES in step S1), the first controller 60 determines whether the start key is already pressed (step S2). When the start key is not pressed (NO in step S2), the first controller 60 waits to start processing until the start key is pressed.

When the start key is pressed (YES in step S2), the first controller 60 outputs, to the image reader 30, an instruction to read an image (step S3) and waits until the first image data is input to the first controller 60 from the image reader 30 (step S4).

When the first image data is input to the first controller 60 from the image reader 30 (YES in step S4), the first controller 60 calculates the basic required time period in accordance with information included in the input first image data and the print setting (step S5). The first controller 60 calculates the basic required time period in accordance with the size of the first image data and information of the print density and the like included in the print setting. The first controller 60 causes the calculated basic required time period to be stored in the first storage unit 70 (step S6).

Next, the first controller 60 converts the input first image data into print data (step S7). The first controller 60 outputs the converted print data to the printing unit 40 (step S8) and causes the printing unit 40 to perform printing.

Next, the first controller 60 determines whether the second image data is already input to the first controller 60 from the image reader 30 (step S9). When the second image data is input to the first controller 60 (YES in step S9), the first controller 60 reads the basic required time period from the first storage unit 70 and adds the same basic required time period as the read basic required time period to the read basic required time period to calculate a cumulative required time period (step S10). The first controller 60 causes the calculated cumulative required time period to be stored in the first storage unit 70. Thereafter, the first controller 60 converts the second image data into print data (step S7), outputs the converted print data to the printing unit 40 (step S8), and causes the printing unit 40 to perform printing.

The first controller 60 repeatedly performs the processing of step S9, S10, S7, and S8 while the input of the second image data to the first controller 60 from the image reader 30 continues. That is, when the second image data is input to the first controller 60 (YES in step S9), the first controller 60 reads the basic required time period and the cumulative required time period from the first storage unit 70 and adds the read basic required time period to the read cumulative required time period to update the cumulative time period (step S10). The first controller 60 causes the updated cumulative required time period to be stored in the first storage unit 70. Thereafter, the first controller 60 converts the second image data into print data (step S7), outputs the converted print data to the printing unit 40 (step S8), and causes the printing unit 40 to perform printing.

When the second image data is not input to the first controller 60 from the image reader 30 even when a preset time period elapses (NO in step S9), the first controller 60 determines that the reading of the image of the original ended, and calculates a printing completion period (step S11).

The first controller 60 calculates the printing completion period by subtracting, from the cumulative required time period stored in the first storage unit 70, a time period elapsed since the first controller 60 transmits the print data of the first image data to the printing unit 40 and causes the printing unit 40 to start the printing. The first controller 60 displays the calculated printing completion period on the touch panel 20 (step S12).

Thereafter, the first controller 60 determines whether the printing by the printing unit 40 is already completed (step S13). The first controller 60 determines whether the first controller 60 already receives, from the printing unit 40, a notification indicating the completion of the printing, thereby determining whether the printing is already completed. When the printing is not yet completed (NO in step S13), the first controller 60 waits until the printing is completed. When the printing is completed (YES in step S13), the first controller 60 ends the first operation.

Second Operation

Next, a second operation of the multifunction peripheral device 1 is described. In the above-described first operation, after the reading of the original mounted on the mounting table 33 is completed, the printing completion period is displayed on the touch panel 20. In the second operation, every time the first image data or the second image data is input to the first controller 60, the first controller 60 calculates the basic required time period and the cumulative required time period and displays the calculated basic required time period and the calculated cumulative required time period as provisional required time periods on the touch panel 20.

The second operation of the multifunction peripheral device 1 is described with reference to a flowchart illustrated in FIG. 3.

Figure 3:
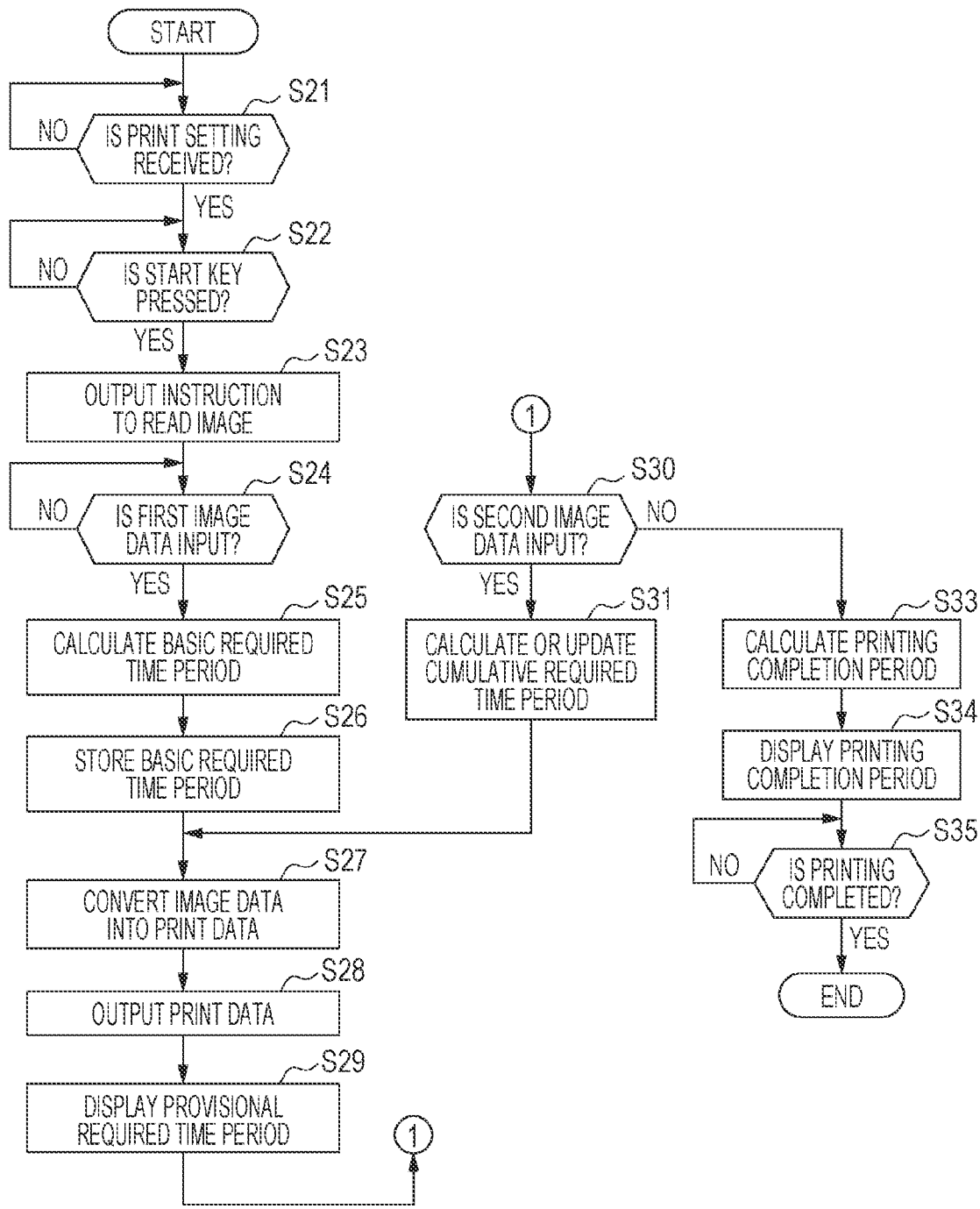
FIG. 3 is a flowchart illustrating a second operation of the multifunction peripheral device.

Operations in steps S21 to S27 of the flowchart illustrated in FIG. 3 are the same as the operations in steps S1 to S7 of the flowchart illustrated in FIG. 2 and will not be described.

The first controller 60 converts the input first image data into print data (step S27) and outputs the converted print data to the printing unit 40 (step S28). Thereafter, the first controller 60 displays the basic required time period calculated in step S25 as a provisional required time period on the touch panel 20 (step S29).

Next, the first controller 60 determines whether the second image data is already input to the first controller 60 from the image reader 30 (step S30). When the second image data is input to the first controller 60 (YES in step S30), the first controller 60 reads the basic required time period from the first storage unit 70 and adds the same basic required time period as the read basic required time period to the read basic required time period to calculate a cumulative required time period (step S31). The first controller 60 causes the calculated cumulative required time period to be stored in the first storage unit 70. Thereafter, the first controller 60 performs the processing of steps S27, S28, and S29.

The first controller 60 repeatedly performs the processing of steps S30, S31, S27, S28, and S29 while the input of the second image data to the first controller 60 from the image reader 30 continues. That is, when the second image data is input to the first controller 60 (YES in step S30), the first controller 60 reads the basic required time period and the cumulative required time period from the first storage unit 70 and adds the read basic required time period to the read cumulative required time period to update the cumulative required time period (step S31). The first controller 60 causes the updated cumulative required time period to be stored in the first storage unit 70. Thereafter, the first controller 60 performs the processing of steps S27, S28, and S29.

When the second image data is not input to the first controller 60 from the image reader 30 even when a preset time period elapses (NO in step S30), the first controller 60 determines that the reading of the image of the original ended, and calculates a printing completion period (step S33).

The first controller 60 calculates the printing completion period by subtracting, from the cumulative required time period stored in the first storage unit 70, a time period elapsed since the first controller 60 transmits the print data of the first image data to the printing unit 40 and causes the printing unit 40 to start the printing. The first controller 60 displays the calculated printing completion period as a determined required time period on the touch panel 20 (step S34).

Thereafter, the first controller 60 determines whether the printing by the printing unit 40 is already completed (step S35). When the printing is not yet completed (NO in step S35), the first controller 60 waits until the printing is completed. When the printing is completed (YES in step S35), the first controller 60 ends the second operation.

Third Operation

Next, a third operation of the multifunction peripheral device 1 is described. In the third operation, the first controller 60 calculates a provisional printing completion period in accordance with the weight of an original detected by the detector 35 and displays the calculated provisional printing completion period on the touch panel 20 until a printing completion period is determined.

The third operation of the multifunction peripheral device 1 is described with reference to a flowchart illustrated in FIG. 4.

Figure 4:
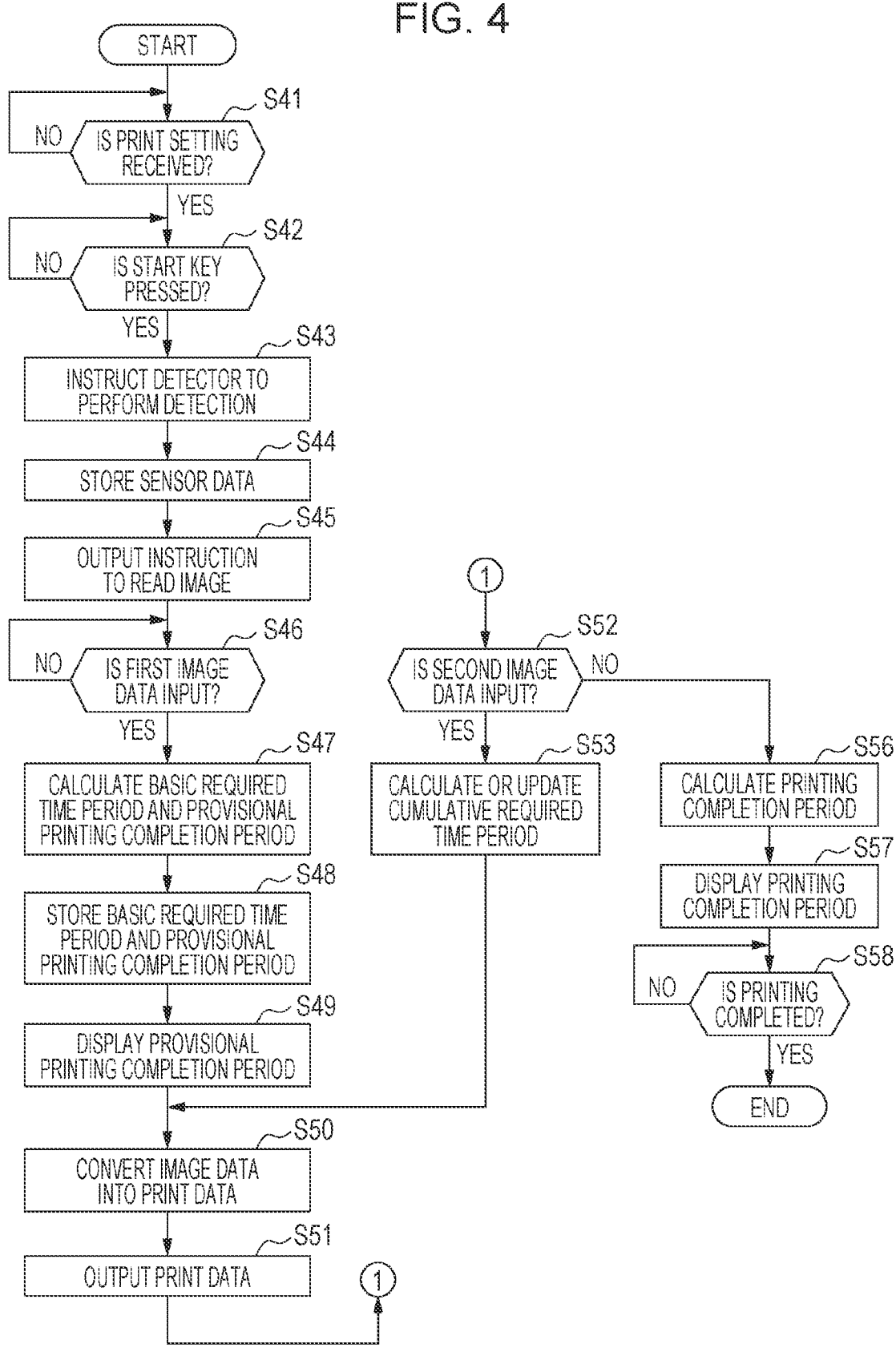
FIG. 4 is a flowchart illustrating a third operation of the multifunction peripheral device.

Operations in steps S41 and S42 of the flowchart illustrated in FIG. 4 are the same as the operations in steps S1 and S2 illustrated in FIG. 2 and will not be described.

When the start key is pressed (YES in step S42), the first controller 60 instructs the detector 35 to detect the weight of the original mounted on the mounting table 33 (step S43). The detector 35 detects the weight of the original mounted on the mounting table 33 and outputs sensor data indicating the result of detecting the weight to the first controller 60. The first controller 60 causes the input sensor data to be stored in the first storage unit 70 (step S44).

Next, the first controller 60 outputs an instruction to read an image to the image reader 30 (step S45). When image data is not input to the first controller 60 from the image reader 30 (NO in step S46), the first controller 60 waits until the image data is input to the first controller 60.

When the first image data is input to the first controller 60 from the image reader 30 (YES in step S46), the first controller 60 calculates the basic required time period in accordance with information of the input first image data and the print setting (step S47). In addition, the first controller 60 reads, from the first storage unit 70, the number of originals corresponding to the weight detected by the detector 35 and multiplies the calculated basic required time period by the read number of originals. The first controller 60 calculates the value of the multiplication result as a provisional printing completion period (step S47).

The first controller 60 causes the calculated basic required time period and the calculated provisional printing completion period to be stored in the first storage unit 70 (step S48). The first controller 60 displays the calculated provisional printing completion period on the touch panel 20 (step S49). Then, the first controller 60 converts the input first image data into print data (step S50) and outputs the converted print data to the printing unit 40 (step S51).

Next, the first controller 60 determines whether the second image data is already input to the first controller 60 from the image reader 30 (step S52). When the second image data is input to the first controller 60 (YES in step S52), the first controller 60 reads the basic required time period from the first storage unit 70 and adds the same basic required time period as the read basic required time period to the read basic required time period to calculate a cumulative required time period (step S53). The first controller 60 causes the calculated cumulative required time period to be stored in the first storage unit 70. Thereafter, the first controller 60 repeatedly performs the processing of steps S50 and S51.

The first controller 60 repeatedly performs the processing of steps S52, S53, S50, and S51 while the input of the second image data to the first controller 60 from the image reader 30 continues. That is, when the second image data is input to the first controller 60 (YES in step S52), the first controller 60 reads the basic required time period and the cumulative required time period from the first storage unit 70 and adds the read basic required time period to the read cumulative required time period to update the cumulative required time period (step S53). The first controller 60 causes the updated cumulative required time period to be stored in the first storage unit 70. Thereafter, the first controller 60 performs the processing of steps S50 and S51.

When the second image data is not input to the first controller 60 from the image reader 30 even when a preset time period elapses (NO in step S52), the first controller 60 determines that the reading of the image of the original ended, and calculates a printing completion period (step S56). The first controller 60 calculates the printing completion period by subtracting, from the cumulative required time period stored in the first storage unit 70, a time period elapsed since the first controller 60 transmits the print data of the first image data to the printing unit 40 and causes the printing unit 40 to start the printing. The first controller 60 displays the calculated printing completion period as a determined required time period on the touch panel 20 (step S57).

Thereafter, the first controller 60 determines whether the printing by the printing unit 40 is already completed (step S58). When the printing is not yet completed (NO in step S58), the first controller 60 waits until the printing is completed. When the printing is completed (YES in step S58), the first controller 60 ends the third operation.

Fourth Operation

Next, a fourth operation of the multifunction peripheral device 1 is described. In the fourth operation, the user enters the number of originals as a print setting and the first controller 60 calculates a provisional printing completion period in accordance with the entered number of originals and displays the calculated provisional printing completion period on the touch panel 20.

Figure 5:
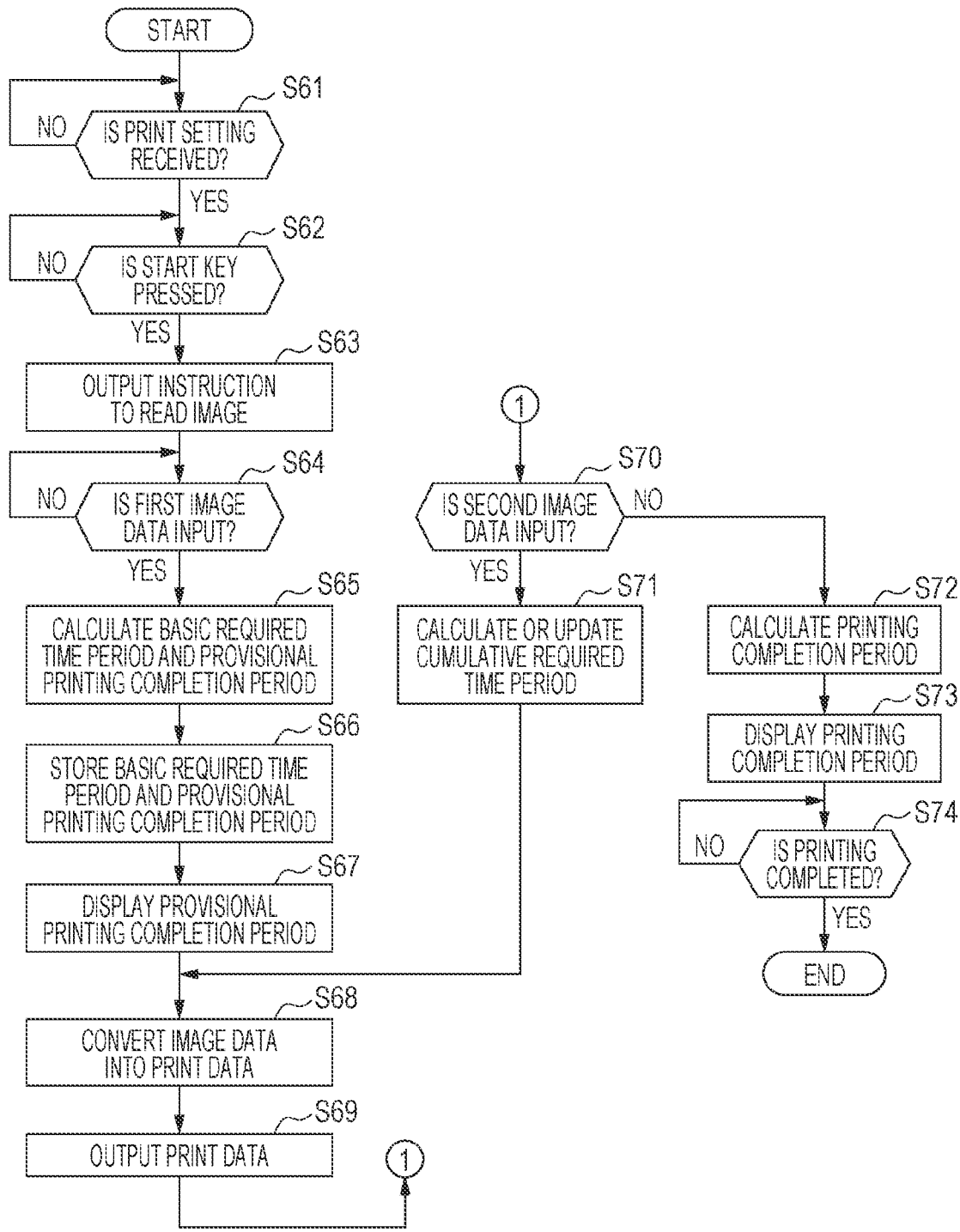
FIG. 5 is a flowchart illustrating a fourth operation of the multifunction peripheral device.

FIG. 5 is a flowchart illustrating the fourth operation of the multifunction peripheral device 1. The fourth operation of the multifunction peripheral device 1 is described with reference to the flowchart illustrated in FIG. 5.

The first controller 60 determines whether the first controller 60 already receives a print setting (step S61). The print setting includes a print density, a setting for single-sided or double-sided printing, and a setting for the number of originals.

When the first controller 60 receives the print setting (YES in step S61), the first controller 60 determines whether the start key is already pressed (step S62). When the start key is not pressed (NO in step S62), the first controller 60 waits until the start key is pressed.

When the start key is pressed (YES in step S62), the first controller 60 outputs, to the image reader 30, an instruction to read an image (step S63) and waits until first image data is input to the first controller 60 from the image reader 30 (step S64).

When the first image data is input to the first controller 60 (YES in step S64), the first controller 60 calculates a basic required time period in accordance with information of the input first image data and the print setting (step S65). In addition, the first controller 60 multiplies the calculated basic required time period by the number of originals input as the print setting. The first controller 60 calculates the value of the multiplication result as a provisional printing completion period (step S65).

The first controller 60 causes the calculated basic required time period and the calculated provisional printing completion period to be stored in the first storage unit 70 (step S66). Next, the first controller 60 displays the calculated provisional printing completion period on the touch panel 20 (step S67). Then, the first controller 60 converts the input first image data into print data (step S68) and outputs the converted print data to the printing unit 40 (step S69). Operations of the first controller 60 after step S69 are the same as the operations in steps S52 to S58 of the flowchart illustrated in FIG. 4 and will not be described in detail.

As described above, the multifunction peripheral device 1 according to the present embodiment includes the image reader 30, the printing unit 40, the touch panel 20, and the first controller 60.

The image reader 30 reads an image of an original. The printing unit 40 prints the image read by the image reader 30 on a print medium.

The first controller 60 calculates, based on first image data read by the image reader 30 and a set print setting, a first required time period required to print the first image data.

In addition, the first controller 60 calculates, based on the first required time period, a second required time period required to form an image of second image data read by the image reader 30 and added to the first image data.

Furthermore, the first controller 60 calculates, based on the first required time period and the second required time period, a printing completion period for completing the printing by the printing unit 40. The first controller 60 displays the calculated printing completion period on the touch panel 20.

According to this configuration, the completion period for completing the printing by the printing unit 40 is displayed on the touch panel 20. Therefore, it is possible to notify the user of the printing completion period for completing the printing by the printing unit 40 and to improve user convenience.

The first controller 60 adds the first required time period to the second required time period to update the second required time period every time the image reader 30 reads the second image data.

According to this configuration, it is possible to calculate the second required time period required to print the second image data additionally read by the image reader 30. Therefore, even when the image reader 30 additionally reads an original, it is possible to notify the user of the second required time period required to print the second image data.

The first controller 60 subtracts, from the sum of the first required time period and the second required time period, a time period elapsed since the start of the image formation by the printing unit 40 so as to calculate the printing completion period.

According to this configuration, it is possible to accurately calculate the printing completion period for completing the printing by the printing unit 40.

Every time the image reader 30 reads the second image data, the first controller 60 calculates the printing completion period in accordance with the first required time period and the second required time period and displays the calculated printing completion period on the touch panel 20.

According to this configuration, it is possible to calculate the printing completion period before the completion of reading of all originals and notify the user of the calculated printing completion period.

The image reader 30 includes the detector 35 that detects the number of originals mounted on the mounting table 33 of the image reader 30 or the weight of an original mounted on the mounting table 33 of the image reader 30.

The first controller 60 calculates the first required time period and the second required time period in accordance with the number of originals detected by the detector 35 or the weight of the original detected by the detector 35.

According to this configuration, it is possible to improve the accuracy of calculating the first required time period and the printing completion period and notify the user of the printing completion period when the reading of the originals is started.

The multifunction peripheral device 1 includes the touch panel 20 that receives a setting for the number of originals to be read by the image reader 30.

The first controller 60 calculates the first required time period and the second required time period in accordance with the setting for the number of originals received via a touch operation performed on the touch panel 20.

According to this configuration, it is possible to improve the accuracy of calculating the first required time period and the printing completion period and notify the user of the printing completion period when the reading of originals is started.

Second Embodiment

Figure 6:
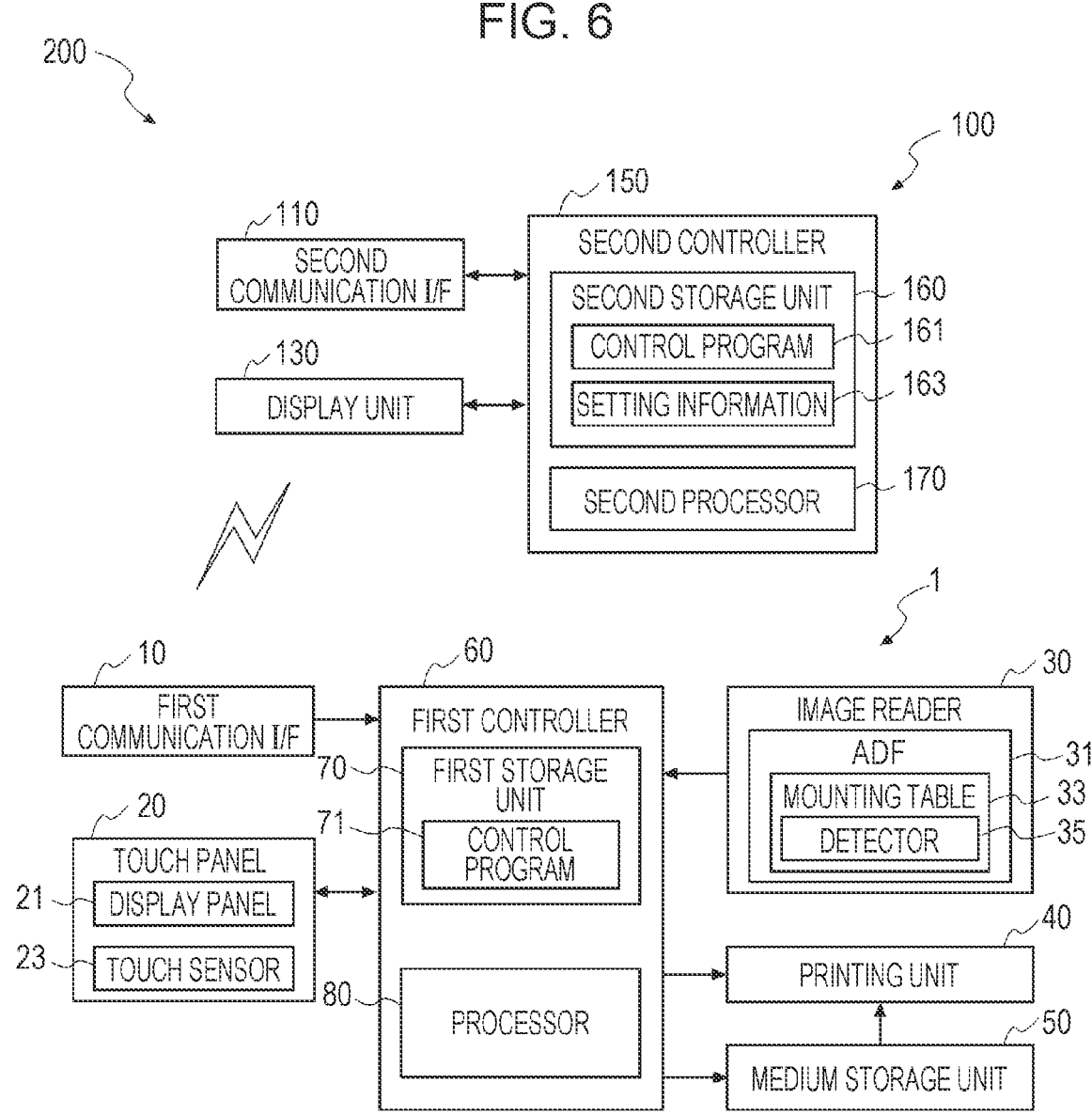
FIG. 6 is a system configuration diagram illustrating a display system.

FIG. 6 is a diagram illustrating a system configuration according to a second embodiment.

The second embodiment is an embodiment of a display system 200. The display system 200 includes a multifunction peripheral device 1 and an information processing device 100. Since the multifunction peripheral device 1 has the same configuration as that illustrated in FIG. 1, the configuration of the multifunction peripheral device 1 will not be described in detail.

The information processing device 100 includes a second communication I/F 110, a display unit 130, and a second controller 150.

The second communication I/F 110 corresponds to a communication unit. The second communication I/F 110 is an interface for wireless communication such as Bluetooth or Wi-Fi. The second communication I/F 110 may be a wired interface having an interface circuit and a terminal such as a USB connector or an Ethernet connector.

The display unit 130 corresponds to a display unit of the information processing device 100. For example, the display unit 130 includes a display panel such as a liquid crystal display or an organic EL panel and displays an image on the display panel in accordance with control by the second controller 150.

The second controller 150 includes a second storage unit 160 and a second processor 170.

The second storage unit 160 includes a RAM and a ROM. The ROM stores a control program 161 and setting information 163. The RAM is used as an arithmetic region for the second processor 170.

The setting information 163 is information regarding an operational setting of the information processing device 100. The setting information 163 includes information in which weights of originals detected by the detector 35 of the multifunction peripheral device 1 are associated with the numbers of originals corresponding to the weight.

The second processor 170 is constituted by a CPU or an MPU. The second processor 170 executes the control program 161 to control the units of the information processing device 100.

When the first controller 60 of the multifunction peripheral device 1 causes the image reader 30 to start reading an original, and first image data is input to the first controller 60 from the image reader 30, the first controller 60 transmits information of the input first image data and a print setting to the information processing device 100. The information of the first image data includes information of sizes of the image data in the vertical direction and the horizontal direction. The print setting includes a print density and a setting for single-sided or double-sided printing.

After the first controller 60 transmits the information of the image data and the print setting to the information processing device 100, every time second image data is input to the first controller 60 from the image reader 30, the first controller 60 transmits, to the information processing device 100, a notification indicating the input of the second image data. That is, when the first image data that is image data of the first original is input to the first controller 60 from the image reader 30, the first controller 60 transmits the information of the first image data and the print setting to the information processing device 100. In addition, when the second image data that is image data of the second and subsequent originals is input to the first controller 60 from the image reader 30, the first controller 60 transmits, to the information processing device 100, a notification indicating the input of the second image data.

When the second controller 150 of the information processing device 100 receives the information of the first image data and the print setting from the multifunction peripheral device 1, the second controller 150 calculates the basic required time period in accordance with the received information and the received print setting. The second controller 150 causes the calculated basic required time period to be stored in the second storage unit 160.

Every time the second controller 150 receives, from the multifunction peripheral device 1, a notification indicating input, the second controller 150 calculates or updates the cumulative required time period. When the second controller 150 receives, from the multifunction peripheral device 1, a notification indicating input and does not cause the cumulative required time period to be stored in the second storage unit 160, the second controller 150 reads the basic required time period from the second storage unit 160, adds the same basic required time period as the read basic required time period to the read basic required time period to calculate the cumulative required time period. The second controller 150 causes the calculated cumulative required time period to be stored in the second storage unit 160.

When the second controller 150 receives, from the multifunction peripheral device 1, a notification indicating input and already causes the cumulative required time period to be stored in the second storage unit 160, the second controller 150 reads the basic required time period and the cumulative required time period from the second storage unit 160 and adds the read basic required time period to the read cumulative required time period to update the cumulative required time period. The second controller 150 causes the updated cumulative required time period to be stored in the second storage unit 160.

As described in the description of the first operation, when the second controller 150 does not receive a notification indicating input for a set time period or longer, the second controller 150 calculates the printing completion period and displays the calculated printing completion period on the display unit 130.

As described in the description of the second operation, the second controller 150 may display the calculated required time period as a provisional required time period on the display unit 130. In this case, when the second controller 150 does not receive a notification indicating input for a certain time period or longer, the second controller 150 calculates the printing completion period and displays the calculated printing completion period on the display unit 130.

As described in the description of the third operation, the multifunction peripheral device 1 may cause the detector 35 to detect the weight of an original mounted on the mounting table 33 and transmit sensor data indicating the result of detecting the weight to the information processing device 100.

The second controller 150 reads, from the second storage unit 160, the number of originals corresponding to the weight indicated in the received sensor data and multiplies the read number of originals by the basic required time period to calculates a provisional printing completion period. The second controller 150 displays the calculated provisional printing completion period on the display unit 130.

As described in the description of the fourth operation, the multifunction peripheral device 1 may transmit the number of originals entered by the user to the information processing device 100.

The second controller 150 multiplies the received number of originals by the basic required time period to calculate a provisional printing completion period. The second controller 150 displays the calculated provisional printing completion period on the display unit 130.

As described above, the display system 200 according to the present embodiment includes the multifunction peripheral device 1 and the information processing device 100.

The information processing device 100 includes the display unit 130 and the second controller 150.

The second controller 150 calculates, based on information of first image data read by the multifunction peripheral device 1 and a print setting set in the multifunction peripheral device 1, a first required time period required to print the first image data.

The second controller 150 calculates, based on the first required time period, a second required time period required to print second image data read by the multifunction peripheral device 1 and added to the first image data.

The second controller 150 calculates, based on the first required time period and the second required time period, a completion period for completing the printing by the multifunction peripheral device 1, and displays the calculated completion period on the display unit 130.

According to this configuration, the completion period for completing the printing by the multifunction peripheral device 1 is displayed on the display unit 130 of the information processing device 100. Therefore, it is possible to notify the user of the completion period for completing the printing by the multifunction peripheral device 1 and improve user convenience.

Each of the above-described embodiments is an aspect and can be arbitrarily modified and applied.

For example, the units illustrated in FIGS. 1 and 6 are an example and are not particularly limited. Hardware individually corresponding to each of the units may not be mounted and a configuration in which a single processor executes a program to implement the functions of the units can be provided. A part of the functions implemented by the software may be hardware, or a part of the functions implemented by the hardware may be implemented by software. Specific detailed configurations of the units of the devices of the multifunction peripheral device 1 and the information processing device 100 can be arbitrarily changed.

It is inferred that when the user wants to know a completion period for completing printing, it is when the printing is performed on a certain number of sheets. Therefore, a print sheet number threshold for determining whether the above-described embodiments are implemented may be set by the user.

When the display method is performed using a computer installed in the multifunction peripheral device 1 or in the information processing device 100, a program to be executed by the computer may be configured in the form of a print medium or in the form of a transmission medium that transmits the program. As the print medium, a magnetic print medium, an optical print medium, or a semiconductor memory device can be used. The print medium may be a portable or fixed print medium such as a flexible disk, a hard disk drive (HDD), a CD-ROM, a DVD, a Blu-ray disc, a magnetooptical disc, a flash memory, or a card type print medium. The print medium may be a nonvolatile storage device such as a RAM, a ROM, or an HDD that is an internal storage device included in a server device. Blu-ray is a registered trademark.

The step units of the operations illustrated in FIGS. 2 to 5 are units divided according to main contents of the processes in order to easily understand the operations of the devices of the multifunction peripheral device 1 and are not limited by how the process units are obtained by dividing the processes, and are not limited by the names of the process units. The processes may be divided into more step units according to the contents of the processes. The processes may be divided such that each step unit includes more processes. The order of the step units may be changed as appropriate.

What is claimed is:

1. An image forming device comprising:
a reader that reads an image of a first original;
an image forming unit that forms an image read by the reader on a recording medium;
a display unit; and
a controller that calculates, based on the image read by the reader and a set image formation condition, a first required time period required to form the image of the first original, displays on the display unit a provisional required time period based on the first required time period between reading of the image of the first original by the reader and reading of an image of a second original by the reader, calculates, based on the first required time period, a second required time period required to form the image of the second original read by the reader and added to the first original, calculates, based on the first required time period and the second required time period, a completion period for completing an image formation by the image forming unit, and displays on the display unit the completion period calculated.

2. The image forming device according to claim 1, wherein
every time the reader reads the second original, the controller adds the first required time period to the second required time period to update the second required time period.

3. The image forming device according to claim 1, wherein
the controller calculates the completion period by subtracting, from a sum of the first required time period and the second required time period, a time period elapsed since the image forming unit starts forming the image.

4. The image forming device according to claim 3, wherein
every time the reader reads the second original, the controller calculates the completion period in accordance with the first required time period and the second required time period and displays on the display unit the completion period calculated.

5. The image forming device according to claim 1, wherein
the reader includes a detector that detects a number of the first and second originals mounted on a mounting table included in the reader or detects a weight of the first and second originals mounted on the mounting table, and
the controller calculates the first required time period and the second required time period in accordance with the number of the first and second originals detected by the detector or the weight of the first and second originals detected by the detector.

6. The image forming device according to claim 1, further comprising a user interface that receives a setting for a number of the first and second originals to be read by the reader, wherein
the controller calculates the first required time period and the second required time period in accordance with the setting received by the user interface.

7. An information processing device comprising:
a display unit;
a communication interface that communicates with an image forming device; and
a controller that
calculates, based on information of an image of a first original read by the image forming device and an image formation condition set in the image forming device, a first required time period required to form the image of the first original upon receiving, from the image forming device, the information of the image of the first original and the image formation condition, displays on the display unit a provisional required time period based on the first required time period between reading of the image of the first original by the image forming device and reading of an image of a second original by the image forming device, calculates, based on the first required time period, a second required time period required to form the image of the second original read by the image forming device upon receiving information of the image of the second original, calculates, based on the first required time period and the second required time period, a completion period for completing an image formation by the image forming device, and displays on the display unit the completion period calculated.

8. A display system comprising:
an image forming device; and
an information processing device, wherein
the information processing device includes a display unit and a controller that
calculates, based on information of an image of a first original read by the image forming device and an image formation condition set in the image forming device, a first required time period required to form the image of the first original, displays on the display unit a provisional required time period based on the first required time period between reading of the image of the first original by the image forming device and reading of an image of a second original by the image forming device, calculates, based on the first required time period, a second required time period required to form the image of the second original read by the image forming device and added to the first original, calculates, based on the first required time period and the second required time period, a completion period for completing an image formation by the image forming device, and displays on the display unit the completion period calculated.

9. A display method comprising:
calculating, based on information of an image of a first original read by an image forming device and an image formation condition set in the image forming device, a first required time period required to form the image of the first original;

displaying, on either a display unit included in the image forming device or a display unit included in an information processing device configured to communicate with the image forming device, a provisional required time period based on the first required time period between reading of the image of the first original by the image forming device and reading of an image of a second original by the image forming device;

calculating, based on the first required time period, a second required time period required to form the image of the second original read by the image forming device and added to the first original;

calculating, based on the first required time period and the second required time period, a completion period for completing an image formation by the image forming device; and displaying the completion period calculated, on either the display unit included in the image forming device or the display unit included in the information processing device.

\* \* \* \* \*